United States Patent [19]
Berggren et al.

[11] 3,957,934
[45] May 18, 1976

[54] FORMING MOLECULARLY ORIENTED CONTAINERS FROM PREFORMS

[75] Inventors: L. John Berggren, Simsbury; Joseph R. Reilly, Naugatuck, both of Conn.

[73] Assignee: Monsanto Company, St. Louis, Mo.

[22] Filed: Sept. 19, 1974

[21] Appl. No.: 507,395

[52] U.S. Cl. .................................. 264/40; 62/63; 165/1; 264/37; 264/80; 264/94; 264/297; 264/348; 425/DIG. 208
[51] Int. Cl.² .................... B29C 17/07; B29C 25/00
[58] Field of Search .................. 264/37, 80, 89, 90, 264/92, 93, 94, 96, 99, 234, 237, 345, 348, 40, 297; 425/326 B, 387 B, 242 B, DIG. 208; 165/1, 120; 62/63

[56] References Cited
UNITED STATES PATENTS

| | | |
|---|---|---|
| 3,149,373 | 9/1964 | Marzillier ..................... 264/94 X |
| 3,265,788 | 8/1966 | Arlo ............................. 264/94 |
| 3,415,915 | 12/1968 | Lecluyse ....................... 264/94 |
| 3,449,792 | 6/1969 | Plummer ....................... 264/94 X |
| 3,502,758 | 3/1970 | Plummer ....................... 264/94 X |
| 3,787,170 | 1/1974 | Gilbert ......................... 264/94 X |
| 3,850,566 | 11/1974 | Moore ......................... 264/94 X |

*Primary Examiner*—Jan H. Silbaugh
*Attorney, Agent, or Firm*—Michael J. Murphy

[57] ABSTRACT

In a method of conditioning preforms to be molded into containers which includes feeding them in groups to a temperature-conditioning zone where they are reduced to orientation temperature for immediate molding into containers, improvements are provided which involve diverting other groups away from the temperature-conditioning zone to an adjacent cooling zone wherein they are reduced to a temperature whereat sticking together cannot occur, prior to collecting them for later molding.

8 Claims, 10 Drawing Figures

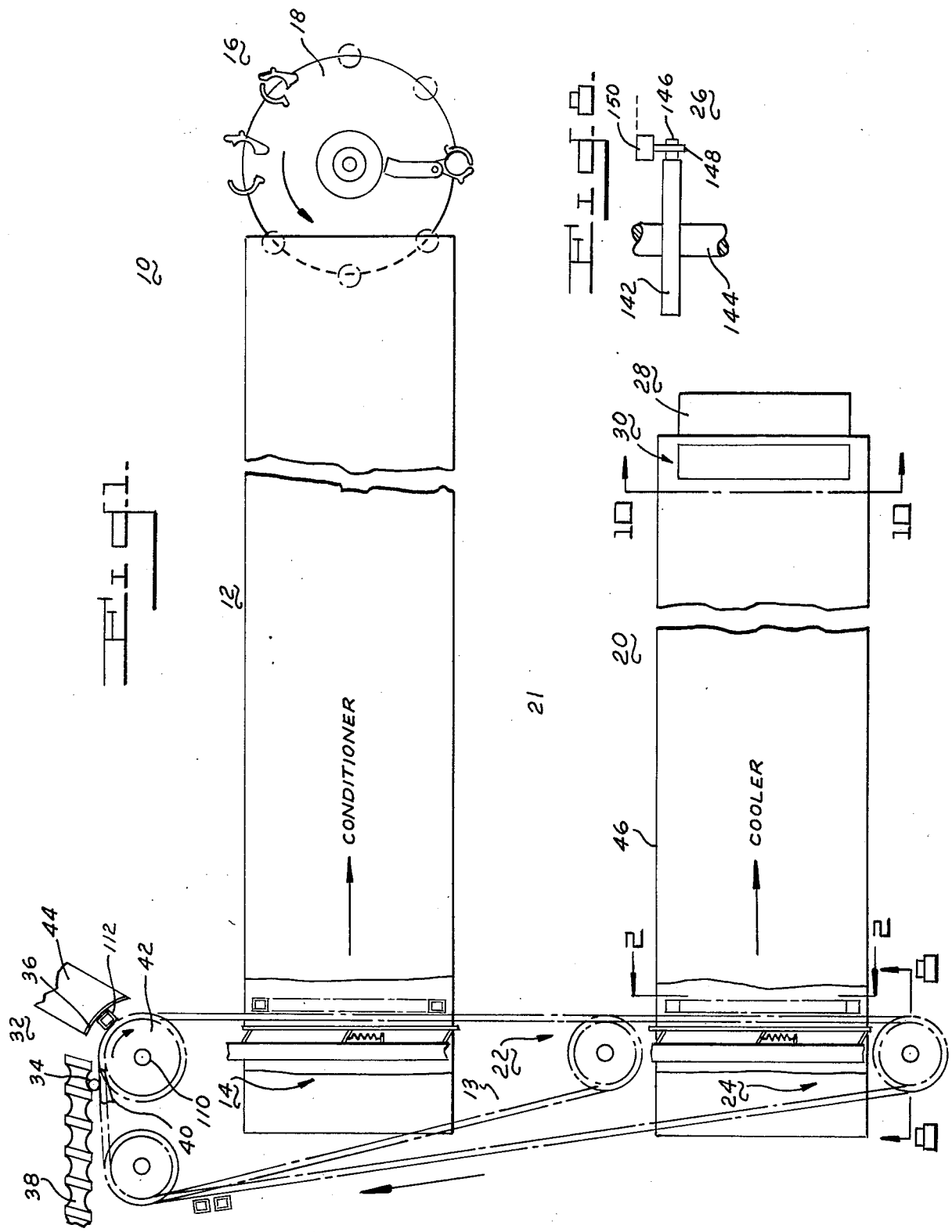

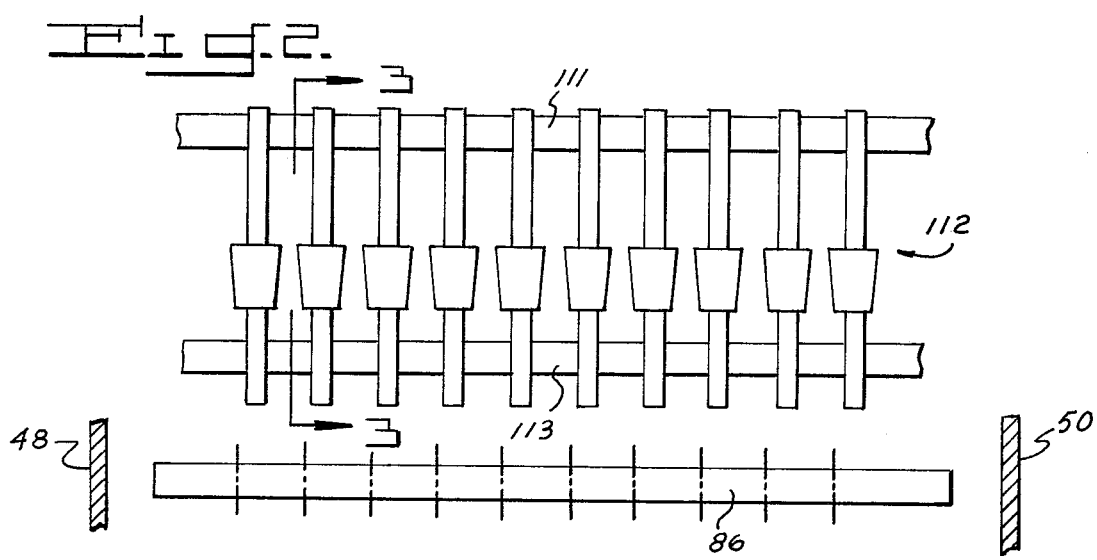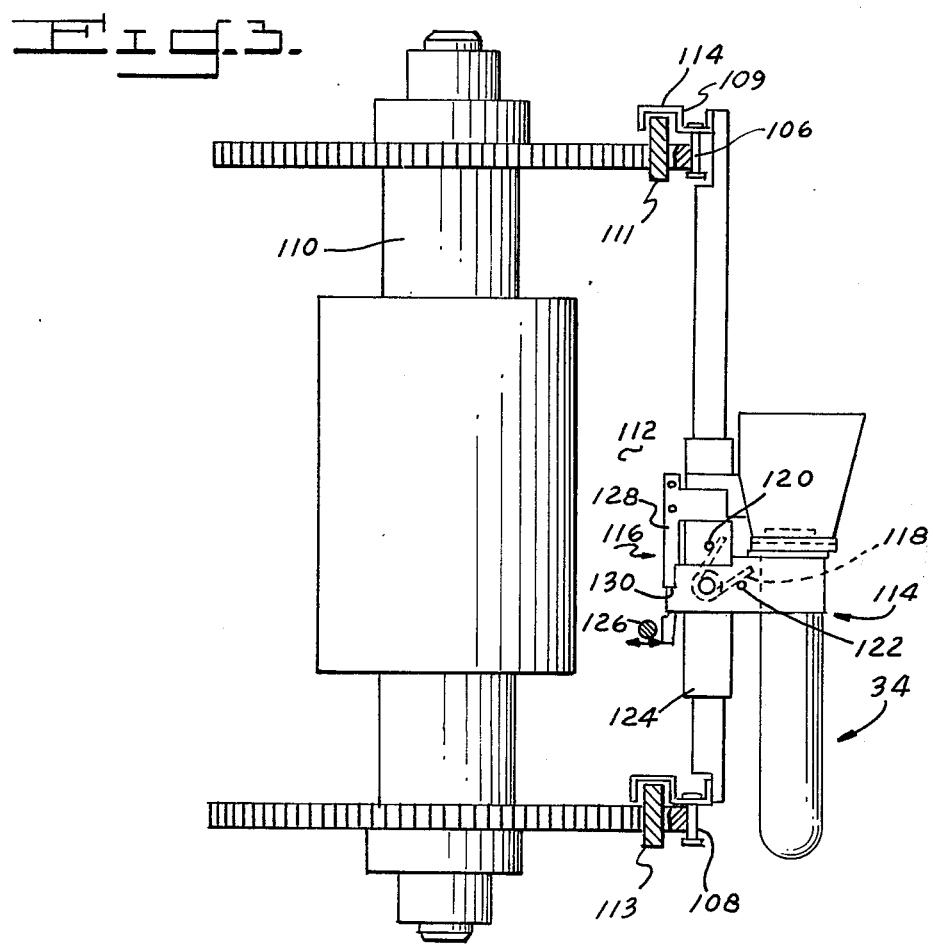

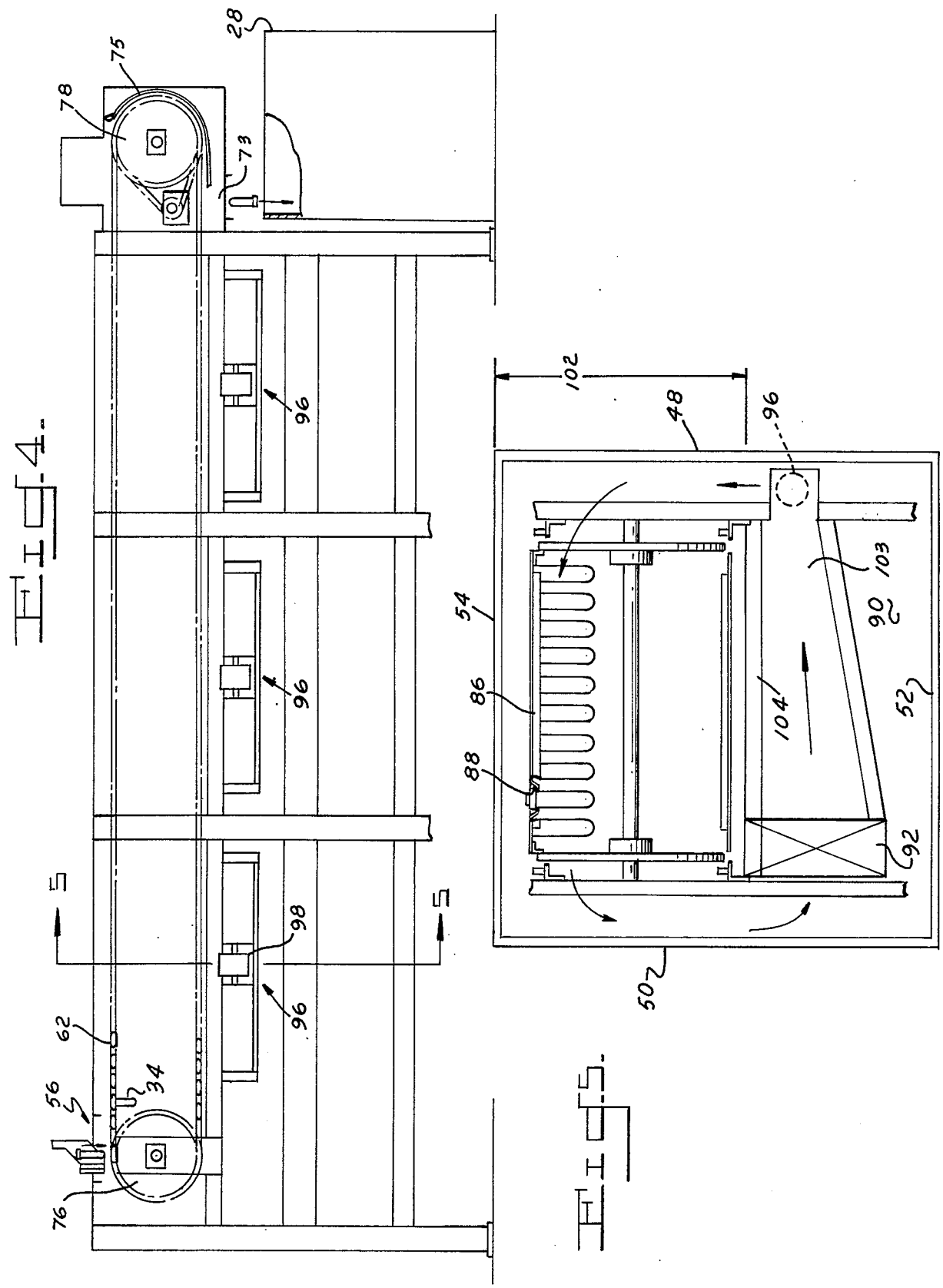

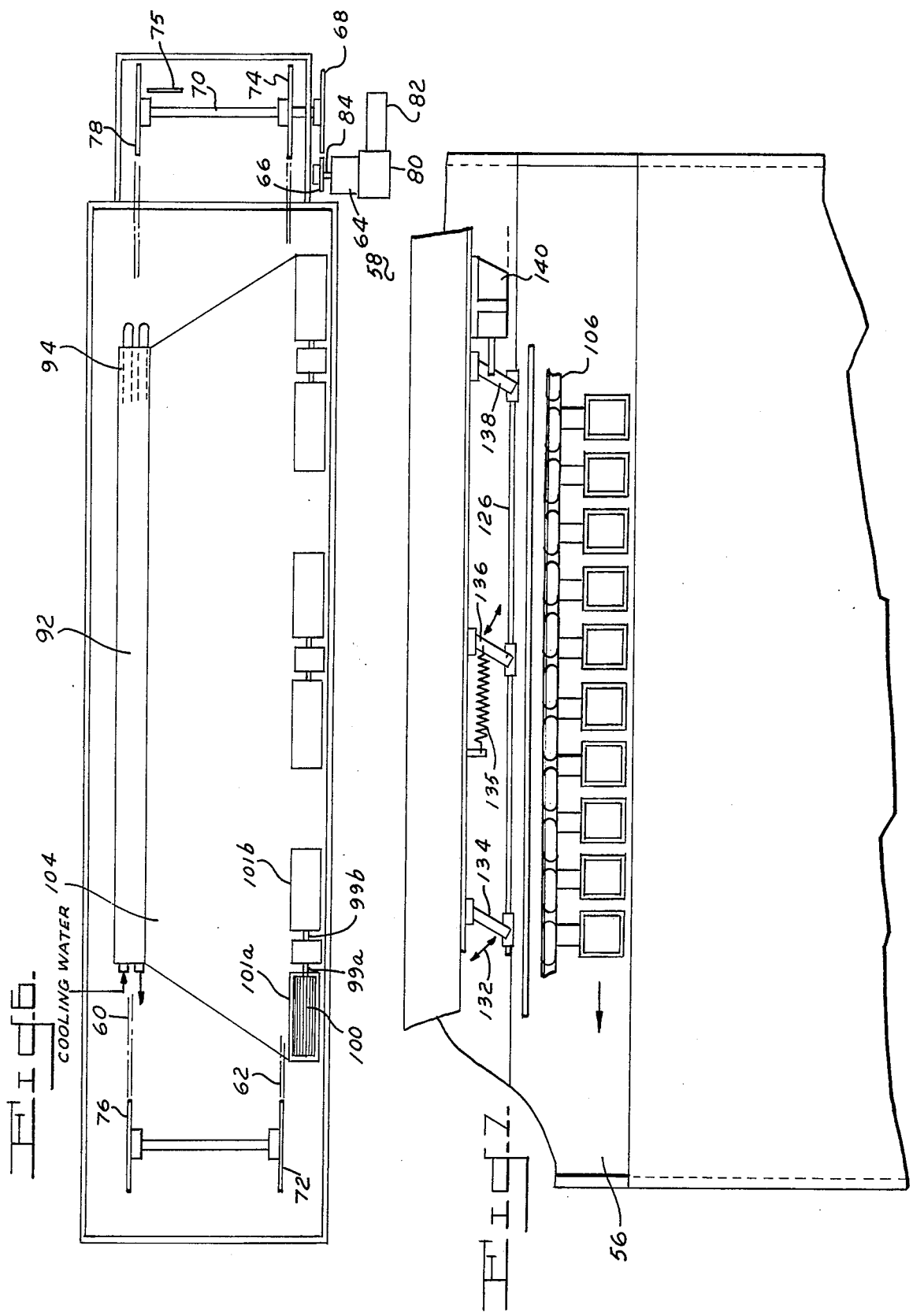

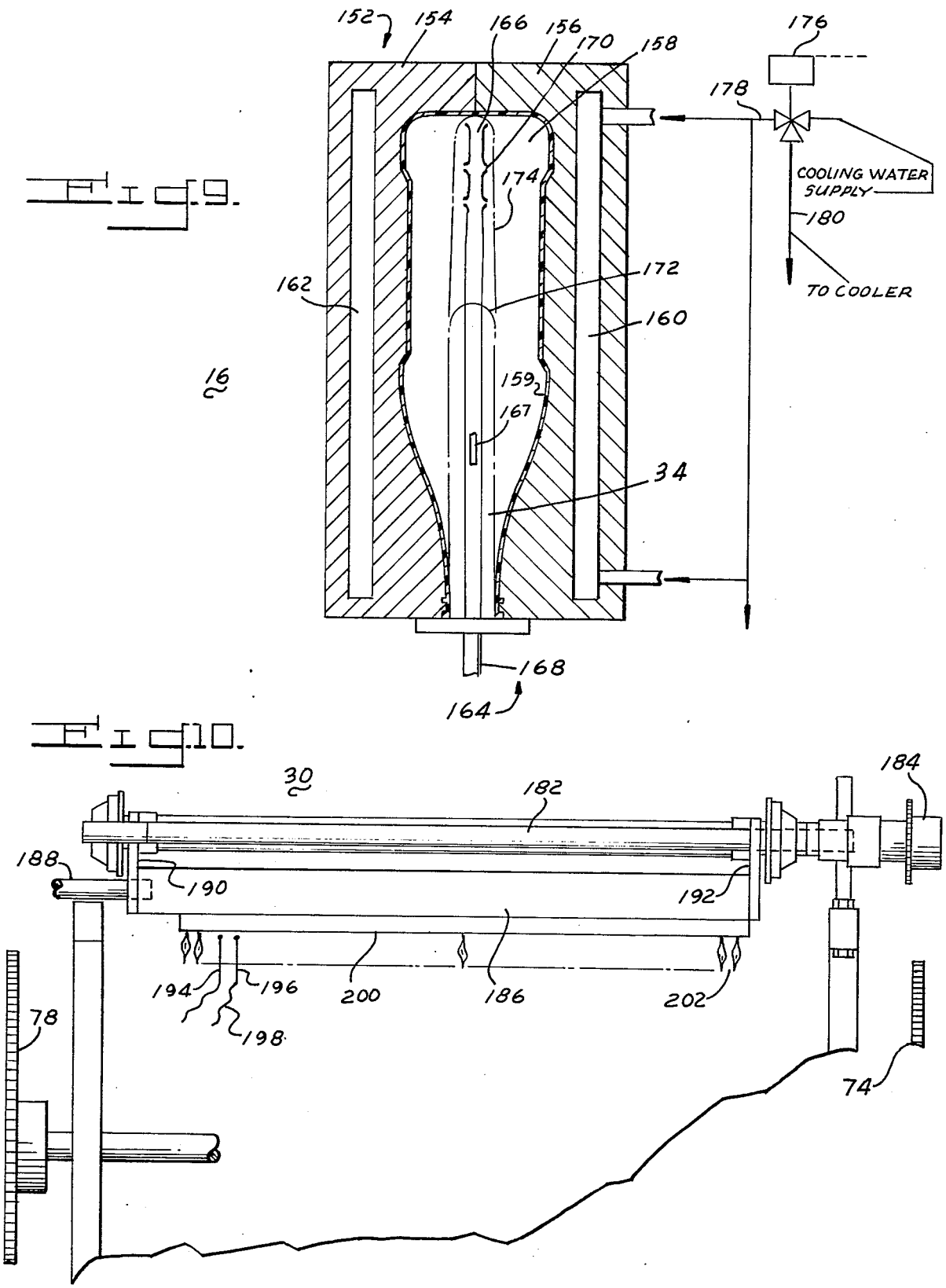

FORMING MOLECULARLY ORIENTED CONTAINERS FROM PREFORMS

CROSS REFERENCE TO COMMONLY OWNED RELATED U.S. APPLICATIONS

A. Ser. No. 418,075, filed Nov. 20, 1973, now U.S. Pat. No. 3,894,835.
B. Ser. No. 424,866, filed Dec. 14, 1973, now U.S. Pat. No. 3,880,301.
C. Ser. No. 467,378, filed May 6, 1974, now U.S. Pat. No. 3,894,454.

BACKGROUND OF THE INVENTION

This invention relates to molding molecularly oriented containers from preforms and more particularly to a method used in conditioning such preforms prior to such molding.

U.S. Pat. No. 3,754,851, describes an "in-line" system for blow molding preforms from initially extruded tubular sections, conditioning such preforms to bring them down to molecular orientation temperature and then immediately stretching and blowing them into containers. U.S. Pat. No. 3,830,893 discloses an alternative system wherein molded preforms which have been cooled to room temperature are reheated back up to orientation temperature prior to final blowing. Both systems have advantages. Regarding the latter reheat approach, this, of course, may be carried out anywhere, but if done at a satellite location remote from that where the preforms are molded and perhaps situated close to various market areas for the finished containers, one central preform molding facility can be used to supply a number of satellite container molding plants which need only be equipped with reheat and container-molding facilities rather than with preform-making facilities also. On the other hand, molding containers directly in line without first cooling all the way down to room temperature has the energy-conserving advantage of utilizing heat incorporated into the plastic during initial extrusion to develop the temperature required for orientation rather than adding it back into the plastic during reheating.

Commonly owned copending U.S. Ser. Nos. 418,075, filed Nov. 21, 1973, now U.S. Pat. No. 3,894,835 and 424,866, filed Dec. 14, 1973, now U.S. Pat. No. 3,880,301, respectively disclose temperature conditioning and preform loading systems for an in-line process. It would be desirable in an in-line system to have the flexibility of providing cool preforms to be later brought up to orientation temperature via reheating. This might be accomplished by cooling the preforms in the molds in which they are formed to some temperature low enough to avoid their sticking together when collected in bulk after ejection from the forming molds. When the preforms are blow molded, however, this can present problems in that the integral neck flash of the yet to be molecularly oriented shape must be removed which is difficult to do in an acceptable, repetitive, high speed fashion when the thermoplastic material is relatively thick and fully set, and especially is this so when it is brittle in nature and prone to crack when machined.

SUMMARY OF THE INVENTION

Accordingly, it is a principal object of this invention to provide versatility to an in-line, cool-down system for blow molding molecularly oriented containers from blow molded preforms.

An additional object of this invention is to provide the capability in such a system for conveniently cooling preforms to well below orientation temperature while retaining the capability of cooling them only to orientation temperature.

Another object of this invention is to provide process improvements in such a system by means of which trimmed, blow molded preforms are provided at temperatures sufficiently low such that sticking on contact is avoided, and which may be later brought back up to orientation temperature in a reheat system for forming molecularly oriented containers.

A further object of this invention is to provide a convenient way of handling trimmed blow molded preforms in a cool-down system for forming molecularly oriented containers when the container-making portion of the system is temporarily shut down, and which avoids the need to shut down the preform molding end of the integrated system.

A specific object of this invention is to provide a tractable method of providing preforms for remolding which are either at molecular orientation temperature or alternatively at a temperature well below orientation temperature.

Other objects of this invention will in part be obvious and will in part appear hereinafter from the following disclosure and claims.

These and other objects are accomplished in apparatus for conditioning thermoplastic preforms to be molded into containers comprising a temperature-conditioning assembly for bringing preforms to molecular orientation temperature and a preform supply assembly for such temperature-conditioning assembly by providing the combination therewith of preform cooling means proximate to but spaced from the temperature-conditioning assembly for reducing preforms to substantially below molecular orientation temperature, an integral extension of the supply assembly to accommodate the cooling means with preforms which includes a loading mechanism, means selectively actuating such loading mechanism and means for collecting preforms at the outlet of the preform cooling means.

Flame polishing means above a housing portion of the preform cooling means may optionally be provided to round any burr left around the open end of the preform as a result of the trimming step.

Also provided in a method of conditioning thermoplastic preforms to be molded into molecularly oriented containers which includes feeding groups of preforms at elevated temperature to a temperature-conditioning zone to reduce at least portions thereof to molecular orientation temperature for molding into containers while at said orientation temperature, are improvements in such method whereby preforms are conveniently treated to accommodate later molding after reheating to molecular orientation temperature, which improvements comprise, in combination, the steps of, diverting other groups of preforms at elevated temperature away from the temperature-conditioning zone to an adjacent cooling zone, reducing the temperature of these latter preforms to substantially below molecular orientation temperature in the cooling zone, and then collecting such preforms after passing through said cooling zone for later molding.

BRIEF DESCRIPTION OF THE DRAWINGS

In describing the overall invention, reference will be made to the accompanying drawings wherein:

FIG. 1 is an overall plan view in general outline form of a system embodying the present invention;

FIG. 2 is an enlarged elevational view along 2—2 of FIG. 1;

FIG. 3 is an elevational view along 3—3 of FIG. 2;

FIG. 4 is a schematic, central sectional view of the cooler portion of the apparatus of FIG. 1;

FIG. 5 is a partially schematic view along 5—5 of FIG. 4;

FIG. 6 is a plan view of the apparatus of FIG. 4;

FIG. 7 is an enlarged view of the preform cooler loading area of the apparatus of FIG. 1;

FIG. 8 is a sectional view along 8—8 of FIG. 1;

FIG. 9 is a schematic, elevational view of a blow molding station for processing preforms; and FIG. 10 is a view along 10—10 of FIG. 1.

DETAILED DESCRIPTION OF THE ILLUSTRATED EMBODIMENT orientation temperature,

Referring now to the drawings, there is shown in FIG. 1, blow molding apparatus, generally indicated as 10, for forming molecularly oriented containers from previously molded preforms. Apparatus 10 includes an elongated preform temperature-conditioning assembly 12 for bringing preforms to molecular orientation temperature, a preform supply assembly 14 for assembly 12, and stretch-blow assemblies 16 on a movably mounted carrier 18 in close proximity to, and in the illustrated embodiment immediately downstream of, assembly 12 for converting temperature-conditioned preforms into containers. Further included as part of the overall apparatus 10 are preform cooling means 20 proximate to but spaced from temperature-conditioning assembly 12 for reducing the temperature of preforms to substantially below molecular orienation tempeature, an integral extension 22 of preform supply assembly 14 to accommodate such cooling means 20 with preforms which includes a loading mechanism 24, means 26 (FIG. 8) actuating loading mechanism 24 when, for example, components of conditioner 12 or carrier 18 cease to function, and means 28 for collecting preforms issuing from cooling means 20 for subsequent processing into containers. Without the presence of preform cooling means 20, preform supply assembly 14 for conditioner 12 would extend only to the area adjacent the latter in the manner generally depicted in outline form at 13 in FIG. 1. An access platform, not shown, may be located in the area designated 21 in FIG. 1 between conditioner 12, and cooling means 20. As an optional feature of the invention, flame polishing means 30 may be provided above cooling means 20, preferably adjacent its discharge end, for finishing open ends of the preforms in the sense of rounding any sharp burrs which might be left thereon after trimming. Screw fed trimming assembly 32 upstream of both temperature-conditioning assembly 12 and cooling means 20 may be provided for removing neck moils from the preforms and which is operatively associated with supply assembly 14 and extension 22 thereof. Trimming assembly 32 is further described in commonly owned, copending U.S. application Ser. No. 467,378, filed May 6, 1974, now U.S. Pat. No. 3,894,454. Generally, preforms 34 are advanced in series between the flights of rotating screw 38 and adjacent fixed guide bar 40 and are gripped within cooperating peripheral grooves in revolving wheel 42 and opposing fixed anvil 44 and advanced in rolling contact therebetween across knife 36 associated with anvil 44 which slices through the plastic above the finish, thereby separating the waste neck moil from the rest of the article.

Turning now to FIGS. 4–6, preform cooling means 20 comprises a horizontally disposed elongated housing supported by suitable framing on a flat support surface and extending in the same general direction and at substantially the same vertical elevation as that of adjacent temperature-conditioning assembly 12. Such housing includes a pair of opposing vertical side panels 48, 50, a bottom panel 52 (FIG. 5) and a top panel 54 which may be divided into a series of removable covers, such top panel having an inlet opening 56 formed adjacent the left end in FIG. 4. Means generally indicated as 58 (FIG. 6) are provided for conveying preforms 34 through the housing which includes a pair of laterally spaced endless operating chains 60, 62 extending substantially the length of the housing. Indexing mechanism 64 is operatively connected to chains 60, 62 by drive sprocket 66 and a conventional driving chain meshing with driven sprocket 68 rotatable with main chain drive shaft 70 carrying main chain sprockets 74 and 78, with driven main chain sprockets 72 and 76 being at the other end of the housing. Rotary indexing mechanism 64 is of industrial design and may be coupled via an intermediate speed reducer 80 to a conventional electric motor 82. The output shaft of motor 82 is continuously turning whereas indexing mechanism 64 intermittently imparts rotary input motion on a cyclic basis to its output shaft 84. Obviously alternative types of drive train systems could be employed in place of that just described.

Means are provided for supporting groups of preforms 34 in side-by-side relation as they progress through cooling means 20 from left to right with respect to FIGS. 1, 4 and 6, which include (FIG. 5) successive horizontally extending support bars 86 secured at either end via conventional clips to the links of operating chains 60 and 62. Bars 86, though not shown for purposes of clarity, occupy the entire length of such chains, i.e. being present along the full length of the upper as well as the lower level thereof. Each bar 86 has a series of laterally adjacent openings 88 through which the body portions of the preforms drop when loaded therein, the wall surrounding such openings being sized to supportively engage a molded ledge on the preform beneath the finish in the manner generally indicated in FIG. 5. Though preforms 34 while supported in bars 86 do not rotate during passage through cooler 20 in the illustrated embodiment, such rotary movement could be incorporated into the system, if desired, by providing a suitable rotating mechanism with each opening 88.

Cooling means 90 (FIG. 5) in the illustrated embodiment is self-contained within the housing of the overall cooler assembly 20 and functions to maintain a reduced air temperature within such housing by means of which heat is extracted from the elevated temperature preforms 34 to reduce them to substantially below molecular orientation temperature. Cooling means 90 comprises a liquid cooled heat exchanger 92 adjacent side panel 50 which conventionally includes a series of tubes 94 (FIG. 6) connected to a source of cooling medium, plus at least one fan, such as 96 (FIG. 4), for recirculating air in a closed loop through the housing. In the illustrated embodiment, three double fans 96 are provided, each of which is conventionally driven by an electric motor 98, and has dual drive shafts (FIG. 6) 99a, 99b turning a rotor 100 within dual housings 101a, 101b. Fans 96 and heat exchanger 92, in the illustrated embodiment, are laterally opposite each other (FIG. 5) beneath operating cooling zone 102 and communicate via air flow passage 103 formed by laterally extending elongated duct 104. Thus, chilled air to convectively reduce the temperature of preforms 34 is continuously recirculated in the direction indicated by the arrows in FIG. 5, i.e. downwardly across exchanger 92, through duct 104, into a horizontal inlet and upwardly through a vertical outlet in housing 101 and across operating cooling zone 102 of cooler assembly 20.

Integral extension 22 (FIG. 1) of the preform supply assembly 14 for conditioner 12 comprises a pair (FIG. 3) 106 and 108 of vertically spaced chains rotatable in conventional meshing engagement with sprockets turning with shaft 110 of trimming assembly 34 for linear movement across and above entry end 56 of preform cooling means 20. Chains 106 and 108 have clips 109 secured thereto which straddle guide bars 111 and 113 to provide stability to such chains between the sprockets with which they mesh. A series of side-by-side preform carrier assemblies indicated in FIGS. 2 and 3 as 112 are supported on chains 106, 108 also via clips 109. Each carrier assembly 112 includes a holder portion 114 having a U-shaped opening, not shown, sized to support a preform 34 at the ledge beneath its finish, a trip mechanism 116 which includes a spring 118 wedged between pins 120 and 122 in such manner as to bias holder portion 114 downwardly toward and against post 124 when bar 126 forces latch 128 to the right in FIG. 3 so as to disengage shoulder 130 on an arm of holder portion 114 from its seat against an opposing surface of the cutout in latch 128.

Loading mechanism 24 of extension 22 comprises (FIGS. 7 and 3) actuating bar 126 pivoted to linkages 134, 136 and 138 for movement in the direction of arrows 132 (FIG. 7) above entry opening 56 of cooling means 20 to simultaneously trigger a plurality (ten in the illustrated embodiment) of trip mechanisms 116 of the carrier assemblies 112 when pivoted against the lower portion of a latch 128. Means such as solenoid 140 having a stem portion pivoted to linkage 138 cyclically reciprocates bar 126 against the force of tension spring 135 into and out of contact with such trip mechanisms at a precise predetermined instant in the operating cycle.

Such carrier assemblies 112 and loading mechanism 24 are described in greater detail in commonly owned, copending application U.S. Ser. No. 424,866, filed Dec. 14, 1973, now U.S. Pat. No. 3,880,301 the content of which is incorporated herein by reference.

Means 26 (FIG. 8) for selectively actuating loading mechanism 24 includes carrier assembly counting switch 142, schematically illustrated as rotatable with driven shaft 144, for continuously cyclically actuating means 140 for causing bar 126 to pivot. Thus, for each revolution of shaft 144, which revolution is proportional to passage of a predetermined number of carrier assemblies beyond a point in their closed loop path of travel, probe 146 of switch 142 strikes sensor 148 of actuator 150 which, via suitable conventional electric circuitry symbolically illustrated by the dotted line in FIG. 8, actuates solenoid 140 to pivot bar 126 into contact with the trigger assemblies of that particular group of carrier assemblies which happen to be opposite it at that point in the cycle.

Referring now to FIG. 9, each stretch blow assembly 16 includes a water cooled split mold 152 comprising cooperating opposing sections 154, 156 having recessed portions formed in one vertical face thereof which together define cavity 158 when closed on each other and which has a surface corresponding to the configuration of a molded container 159. Each section 154, 156 is conventionally cored to provide flow passages such as 160, 162 through which a cooling medium flows to reduce the surface temperature of cavity 158 to facilitate setting of the plastic after blowing. Stretch device 164 cooperates with an opening at one end of mold 152 and includes a rod 166 having an axial bore 167 therein in communication in conventional manner at one end 168 to a source of high pressure air, and also having open-ended branches 170. Rod 166 is extensible via a suitable reciprocating mechanism, not shown, so as to move closed end 172 of a non-elongated preform 34 clamped between the mold sections toward and against the opposite base surface of mold cavity 158, thereby elongating such preform to the shape illustrated at 174, and imparting axial molecular orientation thereto prior to expanding it laterally outwardly against the surface of cavity 158 to generate radial orientation at 90° to such axial orientation, all in rather conventional manner known to those skilled in the art. According to a feature of the invention, cooling water diverting means which, in the illustrated embodiment, comprises electrically actuated three-way solenoid valve 176 may be used to automatically divert cooling water from molds 152 of the plural stretch-blow assemblies 16 to heat exchanger 92 of the preform cooling means 20 when some or all operating component(s) of the in-line apparatus train involving temperature conditioner 12 is shut down. When such shut down occurs, internal parts of valve 176 are conventionally caused to automatically rotate on receipt of a suitable electrical signal generated as a result of interlocking the solenoid of valve 176 with the source of power to carrier 18, for example, so that instead of water flowing to molds 152 through line 178, the flow instead is diverted through line 180 to cooler or heat exchanger 92.

Referring now to FIG. 10, flame polishing means 30, which are illustrated in block form only in FIG. 1, are more particularly described. Though the location may vary, it is preferred that such means 30 be adjacent and above the exit end of preform cooling means 20, since the plastic of preforms 34 at this point in the process is well set (as opposed to its more pliant condition at the inlet end of means 20) and the previously molded neck area is thus less likely to distort on exposure to a flame which might have a temperature as high as 2000°F. Means 30 may be vertically adjustable to provide for varying the intensity of preform exposure and includes shaft 182 oscillatable via an industrially available actuator 184 operatively secured thereto in conventional manner. A burner assembly comprising chamber 186 communicating via tube 188 with a source of premixed air and gas is fixed to and suspended from shaft 182 via clips 190, 192. A pair, 194, 196 of arcing electrodes joined to wires 198 which are connected to an ignition transformer provide the source of ignition for the combustible gas-air mixture issuing from slot orifice 200 of the burner assembly. Means 30 in FIG. 10 is shown with orifice 200 in its operative, flame-polishing, downwardly directed position, with the alternative, inoperative position being 90 degrees thereto such that the orifice opening is parallel to the length of cooling means 20. A suitable protective sheet metal shroud, not shown, may be used to circumscribe the general area around flame polishing means 30. Thus, when a row of preforms supported in bars 86 is indexed beneath means 30, a flame 202 melts and gently rounds any burrs or sharp edges in the plastic on the surface surrounding the open end. As that row of preforms further advances arcuately downwardly from the top to the bottom level of cooling zone 102, the burner assembly is moved 90° arcuately upwardly to an inoperative position via actuator 184. As such downward movement of the preforms occurs, contact is maintained with guide plate 75 to prevent the preforms from prematurely falling out of the openings in bar 86 prior to exiting by gravity through opening 72 beyond the lower end of plate 75 into hopper 28. Such oscillating movement of shaft 182 may not be necessary under certain circumstances, for example when the dwell period of the indexed bar beneath orifice 200 is real short, but care must be taken not to leave the flame in contact with the plastic too long to avoid distorting the previously molded finish.

In operation, molded preforms 34 (FIG. 1) which are at an elevated temperature above that at which substantial molecular orientation can be developed on stretching, are advanced in a continuous row between the flights of screw 38 and opposing guide bar 40 into trimming assembly 32 where the neck moil or integral waste flash portion of each is removed by rolling the part across blade 36 positioned at the proper height so as to slice through the plastic at the joint between the finish and the flash while supported between anvil 44 and wheel 42. Preforms 34 are engaged by anvil 44 and wheel 42 in the flash area during such trimming such that after knife 36 has fully penetrated through the wall at the cut point, the trimmed, still hot preform drops by gravity through the U-shaped opening in holder portion 114 of carrier assembly 112 until it is intercepted by the arms thereof at the ledge beneath the finish and assumes the supported position of FIG. 3. Movement of each carrier assembly 112 is synchronously tuned with the rotary movement of advancing screw 38 such that a carrier assembly is precisely positioned in a preform-receiving position before the flash and preform are fully separated in the trimming station.

Assuming it desirable to convert preforms issuing from the trimming station into oriented containers directly using an in-line, cool down process successively involving temperature-conditioner 12 and stretch-blow assemblies 16, the row of trimmed, supported preforms 34 are continuously advanced linearly toward the temperature-conditioning zone within conditioner 12. When a group of preforms involving a predetermined number thereof are positioned generally above a dwelling transport assembly, not shown, at the feed end of temperature-conditioning assembly 12 which transport assembly has a receiving socket for each preform in the group, an appropriate electrical signal is issued to cause the trip bar of preform supply assembly 14 to pivot against the latch members of each holder portion of a carrier assembly in the manner previously described with respect to FIG. 7, to abruptly pivot such holders downwardly and effectively remove the support from under each preform. This causes them to fall by gravity into the waiting preform transport assemblies whereupon they are advanced through the temperature-conditioning zone wherein they are exposed to an environment such as tempered air which is adequate to bring the temperature of the plastic of body portions thereof down to within the molecular orientation temperature range of the plastic on reaching the exit, right hand end of conditioner 12. An embodiment of such a temperature-conditioner 12 together with process details concerning same may be found in commonly owned, copending U.S. application Ser. No. 418,075, filed Nov. 20, 1973, now U.S. Pat. No. 3,894,835 the disclosure of which is incorporated herein by reference.

At the outlet of conditioner 12, the preforms, now at molecular orientation temperature, are immediately loaded, either manually or automatically, into individual stretch-blow assemblies 16 on continuously rotating carrier 18, whereupon they are molded by stretching longitudinally and expanding radially in molds 152, as previously described with respect to FIG. 9, into molecularly oriented containers 159. In such just described in-line process, the time interval between a preform exiting the discharge end of conditioner 12 and the actual stretching and blowing of it into a container is minimal and insufficient to allow the temperature of the plastic to drop below that at which substantial molecular orientation can be obtained on stretching. For each group of preforms discharged from conditioner 12 to stretch-blow assemblies 16, another group is fed into the conditioner at the entry end in the manner previously described.

In accordance with the present invention, when it is desired to pursue a reheat process with preforms 34 or to continue to treat such preforms without shutting down the preform molding facility when, for example, one or more components of the in-line system just described is temporarily shut down, an electrical signal is generated either automatically as a result of such shut down or manually via a conventional push-button on a control panel, to actuate carrier assembly counting switch 142 (FIG. 8) and actuator 150, such components 142 and 150 being normally deactivated during operation of conditioner 12 and stretch-blow assemblies 16. At the same time, the control system actuating the trip bar of conditioner supply assembly 14 is deactivated. This action results in a selective by passing of conditioner 12 and a continuing advancing movement of the loaded carrier assemblies in the same direction except now the preforms are diverted away from and continue beyond conditioner 12 toward cooling means 20 while still at elevated temperature above molecular orientation temperature. When a group, e.g. ten, of continuously moving supported carrier assemblies are positioned above the open feed end 56 of the housing of cooling means 20, trip bar 126 pivots against the trip mechanism of such group in the manner previously described as a result of probe 146 striking sensor 148 of actuator 150 which in turn actuates solenoid 140. This causes an abrupt shifting of the holder portions of the carrier assemblies of such group arcuately downwardly to release the preforms of such group and enable them to fall by gravity into the stationary support bar 86 temporarily dwelling in loading position via intermitter 64 at such entry end 56. The preforms in this group then proceed intermittently through the upper level of cooling zone 102 where the temperature of the body portions thereof is reduced to substantially below the molecular orientation temperature of the plastic by transfer of heat to the chilled air flowing across the preforms in the manner previously described. When the preforms in a particular support bar 86 turn downwardly from the upper to the lower level of the cooling zone and fall out of such bar through opening 73 into bulk collection hopper 28, the temperature of the plastic is sufficiently low such that sticking of touching preforms will not occur within such hopper. Such temperature can vary but generally should be no greater than 180°F. and preferably no greater than 150°F. as measured on the surface of the body portion of the part below the finish. The chilled preforms accumulated in this manner may then later be reheated, either at the same location as where processed as just described or elsewhere, back up to molecular orientation temperature in a reheat process prior to molding in another blow molding assembly, for example, according to the system disclosed in U.S. Pat. No. 3,830,893 col. 4, lines 48 through col. 5, line 14, such disclosure being incorporated herein by reference.

Subsequent preform-bearing carrier assemblies continue to advance across and above the entry end of the housing of cooling means 20 in the manner just described, with the signal generated by switch 142 being synchronized in conventional manner with the rate at which preforms are supplied to the carrier assemblies in the trimming station. When ten successive carrier assemblies have exited the trimming station and are positioned above such entry end of means 20, another drop signal is generated to release the next group of preforms to a waiting support bar.

Advancing movement of the loaded support bars through the cooling zone preferably occurs while similar movement through the temperature-conditioning zone within conditioner 12 is stopped, i.e. conditioner 12 and cooling means 20 do not function simultaneously, but it is feasible that an either-or type of consecutive switching back and forth could be employed to process one group through conditioner 12 and the next group through cooling means 20 etc. When it is desired to revert to processing through conditioner 12 in the illustrated embodiment, the flame may be extinguished and the power driven parts of preform cooling means 20 electrically deenergized locally or remotely via conventional switches and those of the power train of the in-line system components correspondingly energized, e.g. via interlocks.

Also, as necessary, as the chilled preforms exit the discharge end of the cooling zone, flame 202 downwardly issuing from slot orifice 200 may be directed against the surface portion surrounding the opening of each preform in that particular indexing group for an instant in order to round off any sharp edge thereon prior to discharge to hopper 28.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a method of conditioning thermoplastic preforms to be molded into molecularly oriented containers, which method includes:
feeding groups of preforms at elevated temperature to and through a temperature-conditioning zone to reduce at least portions thereof to molecular orientation temperature for immediate molding into containers while at said orientation temperature;
the improvements in said method whereby preforms are conveniently treated to accommodate later molding after reheating to molecular orientation temperature, which improvements comprise, in combination, the steps of:
   A. diverting other groups of preforms at elevated temperature away from and without entering said temperature-conditioning zone to an adjacent cooling zone;
   B. reducing the temperature of preforms of said other groups to substantially below molecular orientation temperature in said cooling zone; and then
   C. collecting the preforms of said other groups after passing through said cooling zone for said later molding.

2. The method of claim 1 wherein said temperature substantially below molecular orientation temperature is reached in the cooling zone by blowing chilled air across the preforms as they pass through the cooling zone.

3. The method of claim 1 including the step of treating the surface portion of each preform in said other group surrounding an open end thereof to blunt a sharp edge thereon prior to said collecting.

4. The method of claim 1 wherein each such other group is successively loaded into stationary support bars temporarily dwelling at the entry end of the cooling zone prior to passage therethrough.

5. The method of claim 2 including the step of diverting cooling water from molds for forming said molecularly oriented containers from preforms issuing from said temperature-conditioning zone to said cooler to chill said air.

6. In a method of forming molecularly oriented containers from thermoplastic preforms which includes:
advancing a row of supported preforms toward a temperature-conditioning zone;
abruptly removing the supports from under consecutive groups of preforms in said row at the feed end of said temperature-conditioning zone to allow said consecutive groups to fall by gravity into waiting preformtransport assemblies;
advancing said groups of preforms while in said assemblies through the temperature-conditioning zone to bring the temperature of at least portions thereof to molecular orientation temperature; and then
molding containers from said preforms while at molecular orientation temperature;
the improvements in said method whereby preforms are conveniently treated to accommodate later molding after reheating to said molecular orientation temperature, which improvements comprise, in combination, the steps of:
selectively continuing the advancing movement in the same direction of other groups of said preforms in said row beyond and without entering said temperature-conditioning zone toward a nearby cooling zone;
releasing said other groups of preforms at the entry end of said cooling zone to waiting support bars;

passing said other groups through said cooling zone to reduce the temperature thereof to substantially below said molecular orientation temperature;

collecting the preforms of said other groups after passing through said cooling zone; and reheating the preforms of said other groups up to molecular orientation temperature prior to said later molding.

7. The method of claim 6 wherein said advancing movement through the temperature-conditioning zone ceases while said other groups are passing through the cooling zone.

8. The method of claim 6 including the step of generating a signal synchronized with the rate at which preforms are supplied to said row to cause said release to the support bars.

* * * * *